Jan. 23, 1962 W. E. ZRUBEK 3,018,384

TRANSISTOR CIRCUIT FOR CONVERTING PULSE INFORMATION INTO BISTABLE INFORMATION

Filed June 13, 1960

INVENTOR.

WILLIAM E. ZRUBEK

BY

H. H. Losche

Paul S. Colligan

ATTORNEYS

United States Patent Office 3,018,384

Patented Jan. 23, 1962

3,018,384

TRANSISTOR CIRCUIT FOR CONVERTING PULSE INFORMATION INTO BISTABLE INFORMATION

William E. Zrubek, Glen Burnie, Md., assignor, by mesne assignments, to the United States of America as represented by the Secretary of the Navy Filed June 13, 1960, Ser. No. 35,854
1 Claim. (Cl. 307—88.5)

The present invention relates to a transistor switching circuit and more particularly to a transistor circuit for converting a group of pulses into bistable, or off-on, information.

In many radar systems, both active and passive, it is often desired to convert the presence or absence of received pulses into an off-on indication. One particular application concerns the use of received pulses to switch on an automatic tracking circuit, and to cut off automatic tracking when the pulses are no longer received.

The present invention relates to a circuit that performs the desired function of converting the presence, and likewise the absence, of pulses into an off-on indication. The novel circuit provides a first output that is near ground potential when pulses are absent, and near a given potential (B+) when pulses are present. A second output is also available that is 180 degrees out of phase with the first output. An important feature of the present invention is the return of the outputs to their original state of near ground potential when pulses are no longer received. Either of the two outputs can be used to turn-on lights, actuate relays, or initiate action in other circuitry.

It is therefore a general object of the present invention to provide an improved transistor circuit for converting the presence and absence of pulses into bistable, or off-on, information.

Another object of the present invention is to provide a circuit that will provide an output near ground potential when pulses are absent and near a given positive potential when pulses are present.

Figure 1:
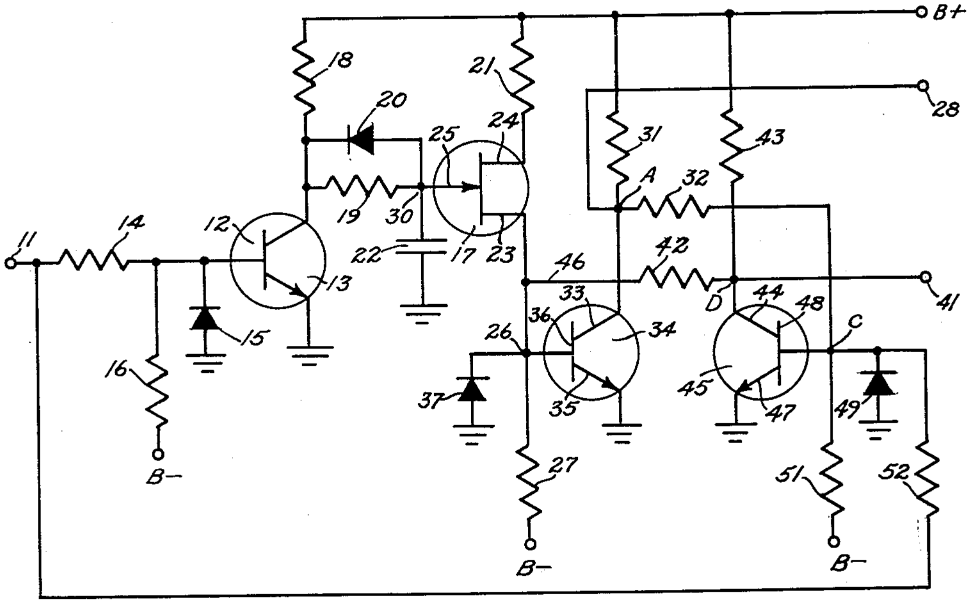
Figure 2:
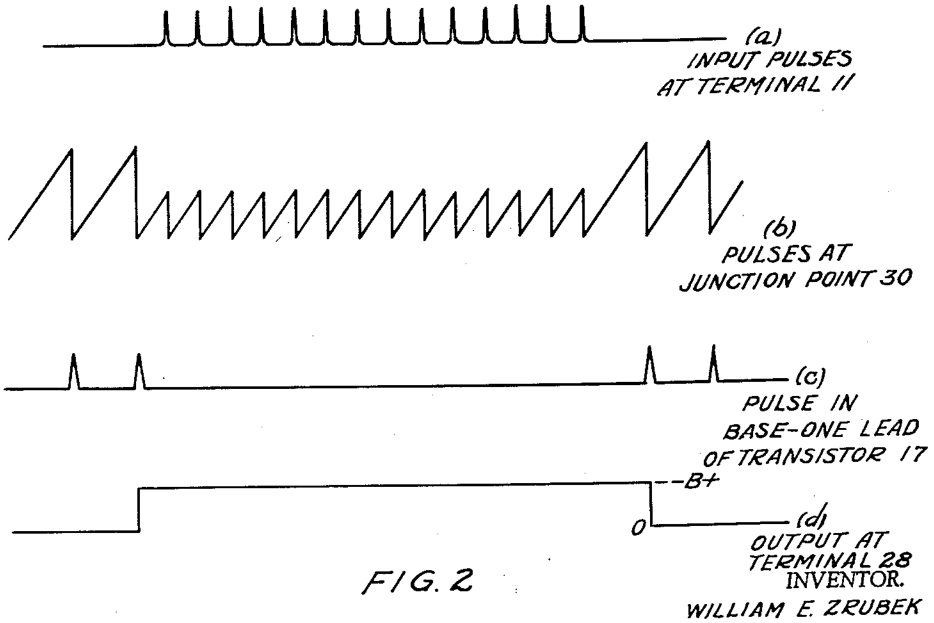

Other objects and advantages of the present invention will be readily appreciated as the same becomes better understood by reference to the following detailed description when considered in connection with the accompanying drawing wherein:

FIG. 1 is a schematic diagram of an embodiment of a transistor switching circuit of the present invention; and FIG. 2 is a graphical representation showing voltages and time relations.

Referring now to FIG. 1 of the drawing, the input terminal 11 is connected to the base electrode 12 of transistor 13 through resistor 14. The base electrode 12 is also connected to ground through diode 15 and to a negative voltage source (B—) through resistor 16.

A unijunction transistor 17 is provided, and it, along with resistors 18, 19, and 21, and capacitor 22, form a free-running sawtooth generator. Unijunction transistor 17 is a three-terminal semiconductor device which has electrical characteristics that are quite different from those of conventional two-junction transistors. Transistor 17 has a highly stable negative resistance characteristic. Two ohmic contacts, called base-one and base-two, which are designated by numerals 23 and 24, respectively, are made at opposite ends of a small bar of n-type silicon and a single rectifying contact, or emitter 25 is made on the opposite side of the bar close to base-two.

As shown in FIG. 1 of the drawing, the emitter 25 of transistor 17 is connected through resistor 19 to the collector of transistor 13, and the base-two, which is designated by numeral 24, is connected through resistor 21 to a positive voltage source (B+). Base-one of transistor 17 is connected through common point 26 and resistor 27 to a negative voltage source (B—).

The first output terminal 28 is connected to junction A, which is common to one end of resistors 31 and 32, and the collector electrode 33 of transistor 34. The other end of resistor 31 is connected to the positive voltage source (B+) and the other end of resistor 32 is connected to junction point C. The emitter 35 of transistor 34 is connected to ground and the base electrode 36 of transistor 34 is connected to common point 26. One end of diode 37 and one end of resistor 27 are also connected to common point 26, as shown.

The second output terminal 41, which provides an output that is 180 degrees out of phase with the first output, is connected to junction D, which is common to one end of resistors 42 and 43 and the collector electrode 44 of transistor 45. The other end of resistor 43 is connected to the positive voltage source (B+) and the other end of resistor 42 is connected by lead 46 to the base electrode 36 of transistor 34. The emitter 47 of transistor 45 is connected to ground and the base electrode 48 is connected to common point C. One end of diode 49 is connected to common point C, which is also connected through resistor 51 to a negative voltage source (B—). Common point C and input terminal 11 are connected together through resistor 52.

In operation, when no input pulses are received, as shown in FIG. 2 of the drawing, transistor 13 is held off by diode 15 and negative voltage source (B—) applied through resistor 16. With transistors 13 and 17 "off," capacitor 22 charges through resistors 18 and 19 toward voltage B+ until the voltage at emitter 25 of transistor 17 reaches the value required to break down the emitter to base-one diode of transistor 17. Transistor 17 then presents a very low impedance to capacitor 22, which discharges rapidly and causes a large pulse of current to flow in the base-one lead of transistor 17. This current will turn on transistor 34. Thus it can be seen that when there are no input pulses at terminal 11, transistor 13 is held off and capacitor 22 can charge to the breakdown voltage of transistor 17. Transistor 34, is therefore, turned on, and junction point "A" is near ground potential. With junction point "A" being near ground potential, transistor 45 is off and junction point "D" is near the voltage level of B+.

When input pulses are present at terminal 11, as before, capacitor 22 charges toward the voltage level B+, however, transistor 13 is turned on every time an input pulse is received and consequently, capacitor 22 is discharged before the breakdown voltage of transistor 17 is reached. The first pulse received at terminal 11 also turns on transistor 45 through resistor 52 and with transistor 45 on, transistor 34 is off. Transistor 34 remains off because junction point "D" is near ground potential and because there are no current pulses in the base-one lead of transistor 17. Thus it can be seen that when pulses are being received at input terminal 11, junction point "A," or the first output, is near the voltage level of B+, and junction point "D," or the second output, is near ground potential. By way of explanation, when the word "Near" is used, it is intended to mean within one volt.

When the pulses at terminal 11 are no longer received, transistor 13 is turned off and capacitor 22 is allowed to charge and thus break down transistor 17 and turn transistor 34 on. Junction point "A" will thus be near ground potential, and junction point "D" will be near the voltage level B+, and thus both junction points "A" and "D" are returned to the same level, and the cycle has been completed.

In the specific embodiment of the present invention shown in FIG. 1 of the drawing, the values of resistors 18 and 19, and the value of capacitor 22, are chosen so that capacitor 22 will not charge to the breakdown voltage of transistor 17 before the next input pulse is expected to arrive. Diode 20 allows a rapid discharge of capacitor 22.

Obviously many modifications and variations of the present invention are possible in the light of the above teachings. It is therefore to be understood, that within the scope of the appended claims, the invention may be practiced otherwise than as specifically described.

What is claimed is:

A transistor switching circuit for converting pulse information into bistable information comprising: an input terminal for receiving signal pulses; an output terminal; first and second junction transistors, each having emitter, collector, and base electrodes, said base electrodes being connected to said input terminal whereby said signal pulses cause conduction in said first and second junction transistors; a sawtooth generator comprising a capacitor, and a unijunction transistor having an emitter electrode and first and second ohmic contacts, said emitter electrode of said unijunction transistor being connected to said collector electrode of said first junction transistor; a third junction transistor having emitter, collector, and base electrodes, said base electrode of said third junction transistor being connected to said first ohmic contact of said unijunction transistor; and a source of direct voltage connected to said second ohmic contact of said unijunction transistor and to each said collector electrode of said first, second and third junction transistors, said capacitor being connected to charge from said source of direct voltage and to discharge through said unijunction transistor.

References Cited in the file of this patent

UNITED STATES PATENTS

| | | |
|---|---|---|
| 2,892,101 | Bright | June 23, 1959 |
| 2,933,623 | Jones et al. | Apr. 19, 1960 |
| 2,968,770 | Sylvan | Jan. 17, 1961 |
| 2,970,228 | White et al. | Jan. 31, 1961 |